(12) United States Patent
Gyarmati et al.

(10) Patent No.: US 12,181,035 B2
(45) Date of Patent: Dec. 31, 2024

(54) TRANSMISSION FOR A VEHICLE, AND POWER TRAIN HAVING SUCH A TRANSMISSION

(71) Applicant: ZF Friedrichshafen AG, Friedrichshafen (DE)

(72) Inventors: Tamas Gyarmati, Bermatingen (DE); Philip Dötschel, Friedrichshafen (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/514,249

(22) Filed: Nov. 20, 2023

(65) Prior Publication Data

US 2024/0167557 A1 May 23, 2024

(30) Foreign Application Priority Data

Nov. 23, 2022 (DE) ...................... 10 2022 212 475.8

(51) Int. Cl.
*F16H 57/029* (2012.01)
*F16H 57/021* (2012.01)
(Continued)

(52) U.S. Cl.
CPC ......... *F16H 57/037* (2013.01); *F16H 57/021* (2013.01); *F16H 57/029* (2013.01);
(Continued)

(58) Field of Classification Search
CPC ................. F16H 57/037; F16H 57/029; F16H 2057/02043; F16H 57/021;
(Continued)

(56) References Cited

U.S. PATENT DOCUMENTS 3,622,164 A * 11/1971 Herbert .................. F16J 15/406
415/230
5,735,364 A * 4/1998 Kinoshita ............... F16H 57/04
180/308

(Continued)

FOREIGN PATENT DOCUMENTS

DE 102013008495 A1 11/2014
DE 102014204571 A1 9/2015
(Continued)

OTHER PUBLICATIONS

English translation of DE102013008495A1; http://translationportal.epo.org; Apr. 24, 2024 (Year: 2024).*
(Continued)

*Primary Examiner* — Roger L Pang
(74) *Attorney, Agent, or Firm* — Dority & Manning, P.A.

(57) ABSTRACT

A transmission for a power train of a vehicle, the transmission including an input shaft, a first output shaft, and a second output shaft, where the first output shaft is received at least partially within the second output shaft, and where the first and second output shafts are rotatable. The transmission further includes a differential operatively arranged between the input shaft and the first and second output shafts, where the differential is configured to divide drive power applied at the input shaft onto the first and second output shafts. Moreover, the transmission includes a stationary component. Additionally, the transmission includes a cover between the second output shaft and the stationary component, where the cover defines at least one duct for guiding lubricant, with the at least one duct extending substantially radially.

9 Claims, 2 Drawing Sheets

(51) Int. Cl.
  *F16H 57/037* (2012.01)
  *F16H 57/04* (2010.01)
  *F16H 57/02* (2012.01)

(52) U.S. Cl.
  CPC ....... *F16H 57/042* (2013.01); *F16H 57/0483* (2013.01); *F16H 2057/02043* (2013.01)

(58) Field of Classification Search
  CPC ........... F16H 2057/0216; F16H 57/042; F16H 57/0469; F16H 57/0482; F16H 57/0483; F16H 57/0486
  USPC ................. 475/204, 220, 248, 160; 184/6.12
  See application file for complete search history.

(56) References Cited

U.S. PATENT DOCUMENTS

| | | | |
|---|---|---|---|
| 5,845,732 A | | 12/1998 | Taniguchi et al. |
| 9,464,666 B2 | | 10/2016 | Ziegler et al. |
| 10,927,961 B2 | * | 2/2021 | Hoehle ................ F16J 15/4474 |
| 2014/0141918 A1 | | 5/2014 | Fukami et al. |
| 2014/0147068 A1 | * | 5/2014 | Dunlap ............... F16C 33/1065 29/898.054 |
| 2017/0284392 A1 | * | 10/2017 | Yano ....................... F04C 29/00 |

FOREIGN PATENT DOCUMENTS

| | | |
|---|---|---|
| DE | 102013215877 B4 | 6/2016 |
| DE | 102015207202 B3 | 7/2016 |
| DE | 102021207527 A1 | 1/2023 |
| EP | 4056875 A1 * 9/2022 ........... F16H 57/021 |
| JP | 2022-064021 A | 4/2022 |

OTHER PUBLICATIONS

CN114087345A; Song; published Feb. 25, 2022; with English translation Apr. 24, 2024 (Year: 2024).*

English translation of EP4056875A1; http://translationportal.epo.org; Aug. 13, 2024 (Year: 2024).*

German Office Action DE 10 2022 212 475.8, dated Jun. 30, 2023. (24 pages).

* cited by examiner

TRANSMISSION FOR A VEHICLE, AND POWER TRAIN HAVING SUCH A TRANSMISSION

CROSS-REFERENCE TO RELATED APPLICATION

The present application is related and has right of priority to German Patent Application No. 10 2022 212 475.8 filed on Nov. 23, 2022, the entirety of which is incorporated by reference for all purposes.

FIELD OF THE INVENTION

The invention relates generally to a transmission for a power train in a vehicle, the transmission including an input shaft, a first output shaft, a second output shaft, and a differential, the differential being operatively arranged between the input shaft and the two output shafts, the differential dividing drive power applied at the input shaft onto the two output shafts. The invention further relates generally to a power train with such a transmission.

BACKGROUND

An epicyclic gearing is described in DE 10 2013 215 877 B4 for branching the drive power applied at a power input to a first power output and to a second power output in conjunction with a reduction of the output rotational speed to a rotational speed level that is below the input rotational speed at the power input. The epicyclic gearing has a first planetary gear stage, which includes a first sun gear, a first planetary gear set, a first planet carrier, and a first ring gear. The epicyclic gearing also has a second planetary gear stage, which similarly includes a second sun gear, a second planetary gear set, a second planet carrier, and a second ring gear. The epicyclic gearing also has a third planetary gear stage, which includes a third sun gear, a third planetary gear set, a third planet carrier, and a third ring gear. The first sun gear acts as a power input, wherein the first planet carrier is connected to the second sun gear for conjoint rotation. The second planet carrier is fixed in position, the first ring gear is connected to the third sun gear for conjoint rotation, and the third ring gear is connected to the second planet carrier for conjoint rotation. A first power output is brought about via the third planetary gear stage, whereas a second power output is brought about via the second ring gear of the second planetary gear stage.

In these types of transmissions, sealing sleeves and rings are generally inserted between the two output shafts. Tracks for sealing elements, in particular for rectangular rings, are formed on the sealing sleeves and rings. In addition, a cover element is spatially arranged between the two output shafts, the cover element generally having the sole function of bridging a change of diameter between a bearing element, which counter-rotatably supports the two output shafts, and a radial shaft sealing ring. In other words, a comparatively large number of single parts is needed in the space between the output shafts in order, in particular, to achieve a sufficient sealing effect between the counter-rotatably mounted output shafts.

SUMMARY OF THE INVENTION

The present invention provides a transmission for a power train that is less complex and, therefore, is assembled more easily and faster than prior transmissions.

A transmission for a power train in a vehicle is provided according to example aspects of the invention, the transmission having an input shaft, a first output shaft, a second output shaft, and a differential. The differential is operatively arranged between the input shaft and the two output shafts and divides drive power applied at the input shaft onto the two output shafts. The first output shaft is rotatably mounted and arranged, in part, spatially within the second output shaft. A cover element is sealingly arranged spatially between the second output shaft and a stationary component, where the cover element has at least one duct for guiding lubricant, the at least one duct extending substantially radially.

In principle, any suitable differential is usable. Preferably, the differential is an integral differential, having a first planetary gear set and a second planetary gear set operatively connected to the first planetary gear set, each of the first and second planetary gear sets including multiple gear set elements. A first output torque is at least indirectly transmittable onto the second output shaft by the first planetary gear set. A bracing torque in the first planetary gear set is convertible in the second planetary gear set such that a second output torque that corresponds to the first output torque is transmittable onto the first output shaft.

An integral differential is considered in the framework of this invention to be a differential that has both a first planetary gear set and a second planetary gear set operatively connected to the first planetary gear set, wherein the first planetary gear set is drivingly connected to the input shaft, to the second planetary gear set, and at least indirectly to the first output shaft, and the second planetary gear set is drivingly connected to the second output shaft. Additionally, the input torque to the input shaft is convertible by such an integral differential and is distributable and transmittable at a defined ratio onto the two output shafts. Preferably, 50%, i.e., one half, of the input torque is transmitted onto each of the output shafts. Therefore, the differential does not have a component that is subjected to both output torques. In other words, the two torques are never combined. Furthermore, the differential has no gears that rotate in a block, or without a rolling motion, when the output rotational speeds of the output shafts are identical. Consequently, the intermeshed components in the differential always rotate in relation to one another, independently of the output rotational speeds of the output shafts.

The first output shaft is preferably arranged so as to be rotatable with respect to the second output shaft via at least one bearing element. It suffices when the first output shaft is mounted so as to be rotatable with respect to the second output shaft via only a single bearing element. A bearing element, preferably a grooved ball bearing, is also arranged spatially outside the second output shaft. The bearing element outside the second output shaft is axially secured on the second output shaft. The bearing element is axially secured preferably by snap rings or the like. A cover element allows the second output shaft to be mounted on the stationary component or on the transmission housing with the bearing element premounted thereon. The transmission is already sealed and closed by subsequently installing the cover element and bolting it into place.

The cover element is preferably bolted or non-rotatably arranged on a transmission housing or a housing-fixed component, wherein the two output shafts turn in relation to the cover element. The cover element ensures that the output shafts turn in relation to the cover element with the least amount of friction possible.

The output shafts of the transmission are, in particular, operatively connectable to a respective wheel on the vehicle. The particular output shaft is connectable to the associated wheel directly or indirectly, i.e., via, for example, a joint and/or a wheel hub.

The input shaft is preferably a hollow shaft. As a result, one of the output shafts, preferably the second output shaft, fits axially inside the input shaft. One of the output shafts, in particular the second output shaft, preferably extends through the transmission and potentially through the drive unit in the power train. The particular output shaft therefore extends through the transmission "inline" for transmitting drive power onto the wheel that is operatively connected to the particular output shaft. In this case, the output shafts are advantageously arranged coaxially to one another. Due to the coaxial arrangement of the output shafts, a radially slender transmission is realized. An arrangement of the output shafts in which the output shafts are in parallel to and offset from one another is also conceivable and is implementable by appropriate gear stages. The input shaft is preferably at least indirectly connected to a drive shaft in a drive unit for conjoint rotation. The drive unit generates drive power that is transmitted onto the input shaft and the transmission via the drive shaft.

A "shaft" is considered to be a rotatable component in the transmission with which various components in the transmission are connected to one another for conjoint rotation. The respective shaft connects the components axially or radially, or even axially and radially, to one another. A shaft does not have to be a, for example, cylindrical, rotatably mounted machine element for transmitting torques, and instead it is any connecting element that connects individual components or elements to one another, in particular a connecting element that connects numerous elements to one another for conjoint rotation.

If two components in the transmission are "connected or coupled for conjoint rotation," this means, as set forth in the invention, that there is a permanent connection between components, such that they cannot rotate independently of one another. This is therefore also considered to be a permanent rotary joint. In particular, there are no shifting elements between these components, which are components in the differential, and/or shafts, and/or a nonrotating component in the transmission, but instead, these components are permanently coupled to one other. An elastically rotating connection between two components is also considered to be permanent, or such that the elements rotate conjointly.

The cover element seals an interior space in the transmission with respect to the external atmosphere, sealing at least the particular lubricant-guiding duct. As a result, the transmission and the particular duct are protected against dirt and/or moisture ingress. The substantially radially extending duct therefore guides lubricant radially. Lubricant is preferably conveyed from radially outside toward radially inside via the particular duct, which is a bore or a recess, in order to transfer lubricant into the system or into the interior space in the transmission. The cover element therefore combines multiple functions. As such, lubricant is transferred via the cover element via the particular duct, while the particular duct is sealed and protected against dirt. Multiple such lubricant-guiding ducts, which are preferably uniformly distributed, are defined in the perimeter of the cover element.

A slip ring having multiple passage openings distributed over the circumference is preferably arranged radially between an inner circumference of the cover element and an outer circumference of the second output shaft. The slip ring reduces friction between the output shafts, which are mounted so as to be rotatable in relation to one another. The slip ring is preferably secured on the inner circumference of the cover element.

Further preferably, the slip ring is premounted on the cover element. In other words, the slip ring is secured on the cover element before the cover element is installed between the output shafts and the transmission housing and subsequently bolted on the transmission housing. The slip ring is appropriately plastically shaped or formed in order to ensure a fixed seat on the cover element.

A radial shaft seal is preferably arranged radially between the inner circumference of the cover element and the outer circumference of the second output shaft. The radial shaft seal is axially spaced apart from the slip ring on the inner circumference of the cover element, such that lubricant on the inner circumference of the cover element collects spatially between the slip ring and the radial shaft seal. The radial shaft seal is premounted on the cover element and sealingly comes to rest via its inner circumference against the outer circumference of the second output shaft and enables the second output shaft to rotate in relation to the cover element.

According to one exemplary embodiment, a first rectangular ring in a first groove defined in an outer circumference of the second output shaft and a second rectangular ring in a second groove defined in an outer circumference of the second output shaft seal the at least one duct. The rectangular rings are preferably radially supported against the slip ring and slip on the slip ring. The slip ring preferably defines tracks for the rectangular rings on its inner circumference. Rectangular rings are sealing rings having a rectangular cross-section. In particular instances, the rectangular rings have a square cross-section. Rectangular rings are also referred to as a Kantseal or square rings. One advantage of rectangular rings is that they are not significantly deformed even under higher pressures. Rectangular rings are therefore particularly dimensionally stable. The grooves secure the rectangular rings in an axial position during the operation of the transmission.

Rectangular rings allow for a defined and controlled leakage of lubricant. Lubricant starting from the particular substantially radially extending duct between the rectangular rings and the slip ring reaches, for example, the bearing element or other components to be lubricated, or sealing rings.

In this sense, the cover element has at least one substantially radially extending outflow hole for discharging lubricant from radially inside toward radially outside. The outflow hole opens, radially inside the cover element, into the intermediate space between the slip ring and the radial shaft seal and guides the lubricant, which is conveyed into this intermediate space due to the leakage of the particular rectangular ring, from radially inside toward radially outside.

A first sealing element and at least one second sealing element are preferably arranged radially between an outer circumference of the cover element and an inner circumference of the housing-fixed component so as to seal the at least one duct. The sealing elements, similarly to the rectangular rings, seal the particular lubricant-conveying duct. Preferably, the first sealing element is accommodated in a third groove formed on the outer circumference of the cover element and the second sealing element is accommodated in a fourth groove also formed on the outer circumference of the cover element. An axial position of the sealing elements is therefore retained during the operation of the transmission. The sealing elements are radially supported against the housing-fixed component. Each of the sealing elements is preferably an O-ring.

Further preferably, a third sealing element, which is preferably also an O-ring, is arranged on the outer circumference of the cover element. The third sealing element is axially spaced apart from the first and the second sealing elements and delimits an intermediate space between the first sealing element and the third sealing element or between the second sealing element and the third sealing element, depending on which of the two first sealing elements is closer to the third sealing element and how the lubricant is guided. The aforementioned outflow hole opens radially on the outside of the cover element into the intermediate space between the first sealing element and the third sealing element, particularly between the second sealing element and the third sealing element, wherein the sealing elements seal the outflow hole with respect to external dirt.

The term "operatively connected" is considered to be a connection between two components that cannot be shifted, resulting in a permanent transmission of drive power, in particular of rotational speed and/or torque. The connection is implemented directly or via a fixed ratio. The connection is implemented, for example, via a fixed shaft, gear teeth, in particular on a spur gear, and/or with a belt.

The term "at least indirectly" is considered to mean that two components are (operatively) connected to one another via at least one other component, located between the two components, or that the two components are directly connected to one another. Other components are also arrangeable between shafts or gear wheels, which are operatively connected to the shaft or to the gear wheel.

A power train according to example aspects of the invention for a vehicle includes a transmission as described above. The transmission is operatively connected to a drive unit. The drive unit is preferably an electric machine, wherein the input shaft of the transmission is a rotor of the electric machine or is connected or coupled to the rotor or to a rotor shaft for conjoint rotation. The rotor is rotatably mounted with respect to a housing-fixed stator of the electric machine. The electric machine is preferably connected to an accumulator, which supplies the electric machine with electrical energy. The electric machine is also preferably controllable by way of an open-loop or closed-loop system by a power electronics system. The drive unit additionally, or alternatively, includes an internal combustion engine, wherein, in this case, the input shaft is, for example, a crankshaft, or is connected or coupled to the crankshaft for conjoint rotation.

The power train of the type described above is usable in a vehicle. The vehicle is preferably a motor vehicle, in particular an automobile (for example, a passenger car weighing less than 3.5 tons), a bus, or a truck (busses and trucks weighing more than 3.5 tons). In particular, the vehicle is an electric vehicle or hybrid vehicle. The vehicle has at least two axles, wherein one of the axles is an axle that is drivable by the power train. The power train according to example aspects of the invention is operatively arranged on this drivable axle and the power train transmits drive power from the drive unit onto the wheels on this axle via the transmission according to example aspects of the invention. It is also conceivable that there is a separate power train of this type for each axle. The power train is preferably front-wheel drive, in which the input shaft and the output shafts are substantially transverse to the longitudinal axis of the vehicle. Alternatively, the power train is at an angle to the longitudinal and lateral axes of the vehicle, wherein the output shafts are connected to the wheels on the particular axle with joints that are transverse to the longitudinal axis of the vehicle.

The above definitions and explanations of technological effects, advantages and advantageous embodiments of the transmission according to example aspects of the invention also apply analogously to the power train according to example aspects of the invention, and vice versa.

BRIEF DESCRIPTION OF THE DRAWINGS

One exemplary embodiment of the invention is explained in greater detail in the following with reference to the schematic drawings, in which identical or similar elements are provided with the same reference characters. Therein.

DETAILED DESCRIPTION

Figure 1:
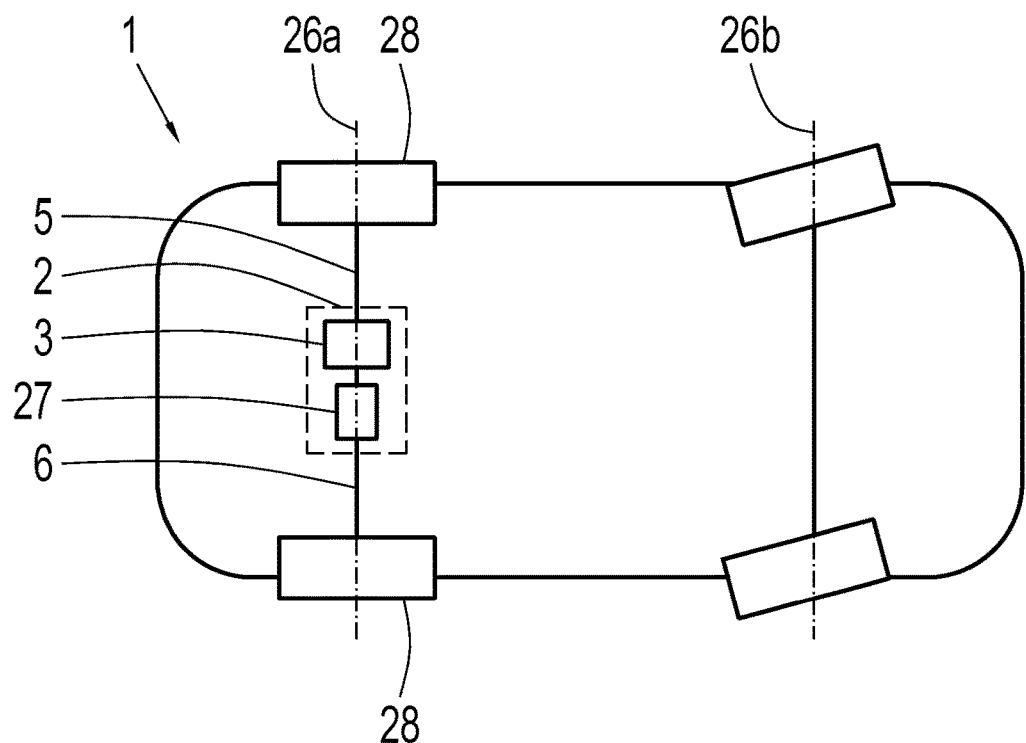
FIG. 1 shows a highly schematic top view of a vehicle with a power train and a transmission according to one preferred embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle 1 with two axles, including a first axle 26a and a second axle 26b, and a power train 2 according to example aspects of the invention, which is drivingly arranged at the first axle 26a. The vehicle 1 is an electric vehicle in this case, wherein the vehicle 1 is driven purely electrically. The first axle 26a is either a front axle or a rear axle of the vehicle 1 and is a driven axle of the vehicle 1. The power train 2 includes a drive unit 27, which is an electric machine, and a transmission 3 operatively connected thereto. The design and the arrangement of the transmission 3 are explained in greater detail in the following figures. The drive unit 27 (the electric machine) also has an accumulator (not shown), which supplies the drive unit 27 with electrical energy, and a power electronics system for the open-loop control and closed-loop control of the drive unit 27. The drive unit 27 includes a rotor (not shown here) and a stator (not shown here), where the rotor is rotatable with respect to the stator and is connected, as a drive shaft, to an input shaft 4 (FIG. 2) in the transmission 3 for conjoint rotation. The rotor is set into a rotational movement in relation to the stator by energizing the stator.

As described with reference to FIG. 2, the drive power of the drive unit 27 is directed via the input shaft 4 into the transmission 3 and, there, is converted by a differential 7, which is an integral differential, and at least indirectly divided onto a first output shaft 5 and a second output shaft 6. The drive unit 27 is coaxial to the integral differential 7.

In order to drive the vehicle 1, a wheel 28 is at least indirectly connected at each of the ends of the output shafts 5, 6, which are coaxial to one another in the present case. According to FIG. 2, joints 35 are arranged between the respective wheel 28 and the output shafts 5, 6 in order to compensate for possible inclinations of the output shafts 5, 6.

Figure 2:
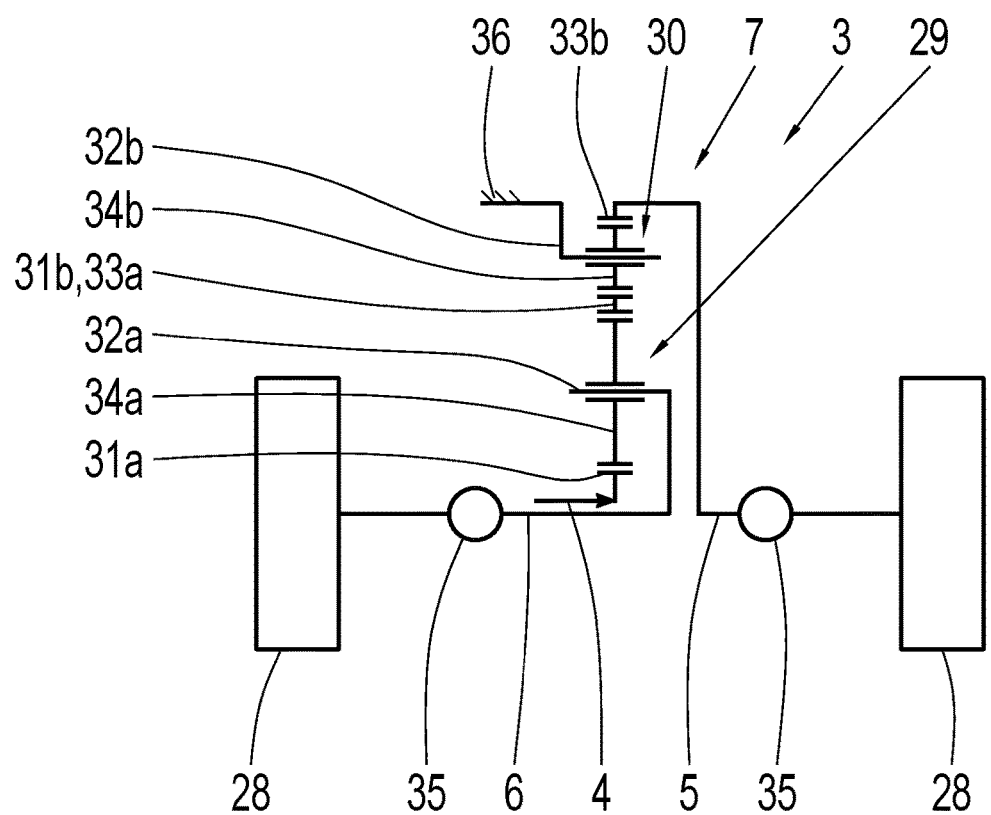
FIG. 2 shows a highly simplified view of the transmission according to the invention shown in FIG. 1.

The transmission 3 shown in greater detail in FIG. 2 is a differential gear transmission. The output shafts 5, 6 are coaxial to one another and extend in opposite directions to the wheels 28 according to FIG. 2, wherein the second output shaft 6 extends axially through the transmission 3, in particular through the integral differential 7, and through the drive unit 27 (not shown in FIG. 2).

The differential 7 has a first planetary gear set 29 and a second planetary gear set 30 operatively connected to the first planetary gear set 29, each of the first and second planetary gear sets 29, 30 including multiple gear set elements. A first output torque is transmittable onto the second output shaft 6 by the first planetary gear set 29. A bracing torque of the first planetary gear set 29 is convertible in the second planetary gear set 30 such that a second output torque, which corresponds to the first output torque, is transmittable onto the first output shaft 5.

The first planetary gear set 29 and the second planetary gear set 30 in this case are each a negative planetary gear set. The first and second planetary gear sets 29, 30 are radially nested and, therefore, are arranged in a common plane, which extends perpendicularly to the axle 26a. For instance, the first planetary gear set 29 is arranged, in the present case, radially within the second planetary gear set 30. Axial installation space is reduced as a result. In the present case, the first planetary gear set 29 includes a first sun gear 31a as a first gear set element, a first planet carrier 32a as a second gear set element, a first ring gear 33a as a third gear set element, and multiple first planet gears 34a, where the first planet gears 34a are meshed with the first sun gear 31a and the first ring gear 33a, and rotatably arranged on the first planet carrier 32a. The first sun gear 31a is a ring-shaped gear and the input shaft 4, which is connected thereto for conjoint rotation, is a hollow shaft. The first output shaft 5 extends axially through the first sun gear 31a of the first planetary gear set 29. Furthermore, the second planetary gear set 30 includes a second sun gear 31b as a first gear set element, a second planet carrier 32b as a second gear set element, a second ring gear 33b as a third gear set element, and multiple second planet gears 34b, where the second planet gears 34b are meshed with the second sun gear 31b and the second ring gear 33b, and rotatably arranged on the second planet carrier 32b.

The first planet carrier 32a of the first planetary gear set 29 is connected to the second output shaft 6 for conjoint rotation. The first ring gear 33a of the first planetary gear set 29 is connected to the second sun gear 31b of the second planetary gear set 30 for conjoint rotation. The second planet carrier 32b of the second planetary gear set 30 is supported in a housing-fixed manner against a stationary component 36, the stationary component 36 being the transmission housing in the present case. In addition, the second ring gear 33b of the second planetary gear set 30 is connected to the second output shaft 6 for conjoint rotation via a coupling element, which is a ring gear carrier in this case.

It is explicitly pointed out that the assignment of the gear set elements to the elements of the particular planetary gear set 29, 30 are interchangeable. The particular connection of the sun gear, the planet carrier and the ring gear, as the gear set elements, is implemented including the sign as required for the ratios. Instead of a negative planetary gear set, the particular planetary gear set 29, 30 may instead be a positive planetary gear set by interchanging the connection of the planet carrier and the ring gear and increasing the absolute value of the stationary gear ratio by one. Conversely, changing from a positive planetary gear set to a negative planetary gear set is also possible.

It is also conceivable to arrange an additional transmission gearing (not shown here), which is, for example, a spur gear stage or a planetary transmission having one or multiple planetary gear set(s), between the drive unit 27 and the transmission 3 in order to increase an overall gear ratio of the drive and/or to implement an axial offset of the output shafts 5, 6, for example, when it is not possible to axially extend one of the output shafts 5, 6 through the drive unit 27.

Figure 3:
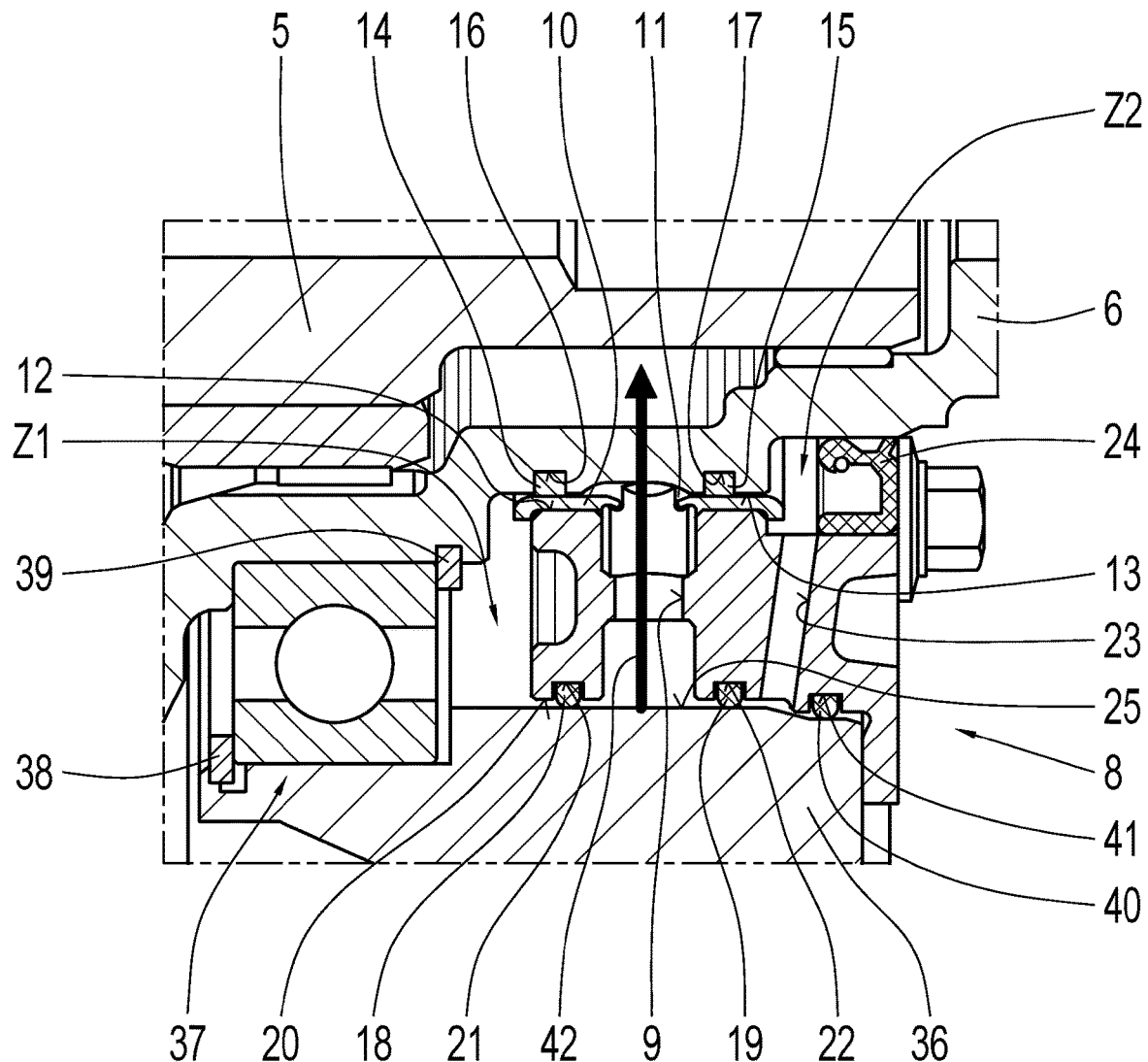
FIG. 3 shows a partial longitudinal sectional view of the transmission shown in FIGS. 1 and 2, particularly illustrating a bearing point between a first output shaft and a second output shaft of the transmission.

According to FIG. 3, the first output shaft 5 is arranged, in part, spatially within the second output shaft 6, the second output shaft 6 being rotatably mounted by a bearing element 37, which is a grooved ball bearing by way of example in this case. Due to the specific design of the transmission 3, the bearing element 37 is premounted on the second output shaft 6 before the first output shaft 5 is placed in the second output shaft 6. The bearing element 37 is axially secured in its position by two snap rings 38, 39.

A cover element 8 (also referred to as "cover"), with which an interior space of the transmission 3 is sealingly closed, is arranged spatially between the two output shafts 5, 6 and the stationary component 36. The cover element 8 has multiple ducts 9, which are uniformly distributed over the circumference and extend radially. A lubricant (not shown here) is conveyed from radially outside toward radially inside via the particular duct 9, as illustrated here by the arrow 42. Lubricant is transferred to the system via the particular duct 9.

A slip ring 10 is secured on the inner circumference 12 of the cover element 8. The slip ring 10 is premounted, so that the slip ring 10 is mountable together with the cover element 8 in the transmission 3. When the cover element 8 is installed, the slip ring 10 is arranged radially between the inner circumference 12 of the cover element 8 and an outer circumference 13 of the second output shaft 6. The slip ring 10 has a number of passage openings 11 that corresponds to the ducts 9. Each passage opening 11 is aligned with a duct 9.

Furthermore, a radial shaft seal 24 is sealingly arranged radially between the inner circumference 12 of the cover element 8 and the outer circumference 13 of the second output shaft 6. On the outer circumference 13 of the second output shaft 6, a first rectangular ring 14 is arranged in a first groove 16 and a second rectangular ring 15 is arranged in a second groove 17 such that the first and second rectangular rings 14, 15 seal the at least one duct. The rectangular rings 14, 15 are formed such that lubricant enters a first intermediate space Z1 between the first rectangular ring 14 and the cover element 8 and the bearing element 37 via the first rectangular ring 14 due to a defined leakage, in order, in particular, to supply the bearing element 37 with lubricant. Lubricant enters a second intermediate space Z2 between the second rectangular ring 15 and the radial shaft seal 24 via the second rectangular ring 15 due also to leakage. For this purpose, the cover element 8 also has at least one substantially radially extending outflow hole 23, which guides lubricant from radially inside, in the second intermediate space Z2, radially outwardly.

Three sealing elements, including a first sealing element 18, a second sealing element 19, and a third sealing element 40, each of which is an O-ring, are arranged in associated grooves 21, 22, 41 such that they are radially between an outer circumference 20 of the cover element 8 and an inner circumference 25 of the stationary component 36. In this sense, the first sealing element 18 is arranged in a third groove 21, the second sealing element 19 is arranged in a fourth groove 22, and the third sealing element 40 is arranged in a fifth groove 41, where the grooves 21, 22, 41 are axially spaced apart from each other. The sealing elements 18, 19, 40 are supported radially against the inner circumference 25 of the stationary component 36.

The first sealing element 18 fluidically separates the particular duct 9 from the first intermediate space Z1. The second sealing element 19 fluidically separates the particular duct 9 and the particular outflow hole 23 from one another. The third sealing element 40 seals the outflow hole 23 with respect to an external atmosphere.

The cover element 8 is a cover for bridging a change of diameter of the second output shaft 6 from the bearing element 37 and to the radial shaft seal 24. The cover element 8 therefore seats the radial shaft seal 24. Furthermore, the cover element 8 transfers lubricant from radially outside toward radially inside (shown with arrow 42) without additional lines or ducts. The cover element 8 also enables lubricant to drain from radially inside toward radially outside via the particular outflow hole 23. The cover element 8 also seals or is equipped with seals such that both the particular duct 9 as well as the particular outflow hole are sealed. With respect to the slip ring 10, the advantage is also achieved that the slip ring 10 is designed more easily and, therefore, more cost-effectively.

In the exemplary embodiment shown in the present case, the cover element 8, which is an integrated component, enables the second output shaft 6 having the premounted bearing element 37 to be mounted on the stationary component 36 from left to right. The transmission 3 is closeable by the cover element 8, which is subsequently installed. Since the bearing element 37 is arranged comparatively far from the cover element 8 in this case, further bearing elements, in particular needle bearings or plain bearings, for the rotatable mounting of the second output shaft 6 with respect to the stationary component 36 are omitted.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 power train
3 transmission
4 input shaft
5 first output shaft
6 second output shaft
7 differential
8 cover element
9 duct
10 slip ring
11 passage opening
12 inner circumference of the cover element
13 outer circumference of the second output shaft
14 first rectangular ring
15 second rectangular ring
16 first groove
17 second groove
18 first sealing element
19 second sealing element
20 outer circumference of the cover element
21 third groove
22 fourth groove
23 outflow hole
24 radial shaft seal
25 inner circumference of the stationary component
26a first axle
26b second axle
27 drive unit
28 wheel
29 first planetary gear set
30 second planetary gear set
31a sun gear of the first planetary gear set
31b sun gear of the second planetary gear set
32a planet carrier of the first planetary gear set
32b planet carrier of the second planetary gear set
33a ring gear of the first planetary gear set
33b ring gear of the second planetary gear set
34a planet gear of the first planetary gear set
34b planet gear of the second planetary gear set
35 joint
36 stationary component
37 bearing element
38 first snap ring
39 second snap ring
40 third sealing element
41 fifth groove
42 arrow
Z1 first intermediate space
Z2 second intermediate space

The invention claimed is:

1. A transmission (3) for a power train (2) of a vehicle (1), comprising:
    an input shaft (4);
    a first output shaft (5);
    a second output shaft (6), the first output shaft (5) being received at least partially within the second output shaft (6), the first and second output shafts (5, 6) being rotatable;
    a differential (7) operatively arranged between the input shaft (4) and the first and second output shafts (5, 6), the differential (7) being configured to divide drive power applied at the input shaft (4) onto the first and second output shafts (5, 6);
    a stationary component (36);
    a cover (8) between the second output shaft (6) and the stationary component (36), the cover (8) defining at least one duct (9) for guiding lubricant, the at least one duct (9) extending substantially radially, and
    a slip ring (10) radially between an inner circumference (12) of the cover (8) and an outer circumference (13) of the second output shaft (6), multiple passage openings (11) being defined about a circumference of the slip ring (10).

2. The transmission (3) of claim 1, wherein the slip ring (10) is secured on the inner circumference (12) of the cover (8).

3. The transmission (3) of claim 2, wherein the slip ring (10) is premounted on the cover (8).

4. The transmission (3) of claim 1, further comprising a radial shaft seal (24) radially between an inner circumference (12) of the cover (8) and an outer circumference (13) of the second output shaft (6).

5. The transmission (3) of claim 1, further comprising:
a first rectangular ring (14) received in a first groove (16) defined on an outer circumference (13) of the second output shaft (6); and
a second rectangular ring (15) received in a second groove (17) defined on the outer circumference (13) of the second output shaft (6),
wherein the first and second rectangular rings (14, 15) seal the at least one duct (9).

6. The transmission (3) of claim 1, further comprising a first sealing element (18) and at least one second sealing element (19) radially between an outer circumference (20) of the cover (8) and an inner circumference (25) of the stationary component (36), the first sealing element (18) and the at least one second sealing element (19) sealing the at least one duct (9).

7. The transmission (3) of claim 6, wherein the first sealing element (18) is received in a third groove (21) defined on the outer circumference (20) of the cover (8) and the second sealing element (19) is accommodated in a fourth groove (22) defined on the outer circumference (20) of the cover (8).

8. The transmission (3) of claim 1, wherein the cover (8) defines at least one outflow hole (23) extending substantially radially, the at least one outflow hole (23) allowing lubricant to be discharged from radially inside the cover (8) radially outwardly.

9. A power train (2) for a vehicle (1), the power train (2) comprising the transmission (3) of claim 1.

* * * * *